US012633734B2

(12) United States Patent
Okafor

(10) Patent No.: US 12,633,734 B2
(45) Date of Patent: May 19, 2026

(54) STRAIN DEAD END CLAMP

(71) Applicant: HUBBELL INCORPORATED, Shelton, CT (US)

(72) Inventor: Nnamdi Gabriel Okafor, Birmingham, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 315 days.

(21) Appl. No.: 18/203,405

(22) Filed: May 30, 2023

(65) Prior Publication Data

US 2023/0420926 A1 Dec. 28, 2023

Related U.S. Application Data

(60) Provisional application No. 63/355,341, filed on Jun. 24, 2022.

(51) Int. Cl.
H02G 7/05 (2006.01)
F16G 11/06 (2006.01)
(52) U.S. Cl.
CPC ............. H02G 7/056 (2013.01); F16G 11/06 (2013.01)
(58) Field of Classification Search
CPC ................................ H02G 7/056; F16G 11/06
See application file for complete search history.

(56) References Cited

U.S. PATENT DOCUMENTS

| | | | | |
|---|---|---|---|---|
| 1,624,399 A | * | 4/1927 | Ellis | H02G 7/056 |
| | | | | 24/135 L |
| 1,765,837 A | * | 6/1930 | Keator | F16G 11/06 |
| | | | | 403/209 |
| 1,858,549 A | | 5/1932 | Jenner | |
| 2,011,138 A | * | 8/1935 | Austin | H02G 7/056 |
| | | | | 24/135 A |
| 2,061,371 A | * | 11/1936 | Taylor | H02G 7/056 |
| | | | | 24/135 A |
| 2,980,378 A | * | 4/1961 | Bethea | F16G 11/06 |
| | | | | 174/79 |
| 4,458,976 A | * | 7/1984 | Hudson | H01R 4/46 |
| | | | | 439/785 |

(Continued)

FOREIGN PATENT DOCUMENTS

| | | | | |
|---|---|---|---|---|
| CN | 203967686 U | * | 11/2014 | |
| DE | 659692 C | | 5/1938 | |
| GB | 291228 A | * | 5/1928 | F16G 11/06 |

OTHER PUBLICATIONS

International Search Report and Written Opinion issued in App. No. PCT/US2023/023867, mailing date Sep. 20, 2023, 14 pages.

(Continued)

*Primary Examiner* — Kimberly T Wood
(74) *Attorney, Agent, or Firm* — Dilworth IP, LLC

(57) ABSTRACT

A clamp including a body, a retaining portion of the body, the retaining portion including a cavity with at least one cavity engagement mechanism and a plurality of holes, a conductor groove extending through the body to the cavity, a keeper removably positioned within the cavity, the keeper including at least one keeper engagement mechanism configured to engage with the at least one cavity engagement mechanism, and a plurality of fasteners for extending into the plurality of holes and securing the keeper in the cavity.

22 Claims, 17 Drawing Sheets

(56) References Cited

U.S. PATENT DOCUMENTS

2021/0376589 A1    12/2021  Palmer

OTHER PUBLICATIONS

Anonymous: "Deadends", Nov. 14, 2017 (Nov. 14, 2017), pp. 1-28, XP093163688, Retrieved from the Internet: URL: https://hubbellcdn. com/catalogfull/DA-OHDeadends.pdf.
International Written Opinion issued in App. No. PCT/US2023/023867, mailing date May 24, 2024, 8 pages.

* cited by examiner 142a 142a 140

140

150 152

STRAIN DEAD END CLAMP

FIELD OF THE INVENTION

The present disclosure relates to clamps, and more particularly, to strain or quadrant dead end clamps for electrical conductors.

BACKGROUND

Strain or quadrant dead end clamps are used to secure electrical conductors in tension to utility poles and towers. Such clamps may be designed in different sizes to accommodate a range of conductors. Since the clamps maintain the tension of the conductor, they are generally tested and rated to handle different tensile strengths. Existing claims are typically rated to hold 40% of the conductor rated breaking strength.

One type of known strain dead end clamp includes a conductor groove, a clevis, and a sag eye. A conductor is run through the conductor groove and secured in the clamp with a keeper and bolts that compress the keeper against the conductor. The sag eye is a loop on the clamp used for taking tension off the line, using a ratcheting mechanism or come-along, so that a user can install the clamp. The clevis is used to attach the clamp to the utility pole or tower.

These and other existing clamps require many parts, are cumbersome to use, and pose challenges with keeper location and placement. Unintended slip of the conductor can occur with existing designs, especially with higher tensile pull applications. They are also limited in their tensile strength.

There is a need for improved clamps that are easier to use, more reliable, and that have higher tensile strengths. The present invention solves these and other problems in the prior art.

SUMMARY

An object of the present invention is to provide a clamp, such as a strain or quadrant dead end clamp, which has improved slip strength ratings, is easier to install and is more reliable.

In one exemplary embodiment according to the present disclosure, the clamp is designed, rated, and tested for an improved normal tension of 60% rated breaking strength of the installed conductor. In one exemplary embodiment according to the present disclosure, the clamp includes a means for engagement between the body of the clamp and the keeper that secures the keeper in place and facilitates easier installation.

In one exemplary embodiment according to the present disclosure, a clamp is provided including a body, a retaining portion of the body, the retaining portion including a cavity with at least one cavity engagement mechanism and a plurality of holes, a conductor groove extending through the body to the cavity, a keeper removably positioned within the cavity, the keeper including at least one keeper engagement mechanism configured to engage with the at least one cavity engagement mechanism, and a plurality of fasteners for extending into the plurality of holes and securing the keeper in the cavity.

In some embodiments, the at least one cavity engagement mechanism includes two slots on opposite sides of the cavity and the at least one keeper engagement mechanism includes two tabs extending from opposite sides of the keeper to engage in the two slots, or vice versa. In some embodiments, each of the two slots extend substantially perpendicular to a longitudinal axis of the cavity and each of the two tabs extend substantially perpendicular to a longitudinal axis of the keeper.

The body may include a top portion with two sidewalls at least partially defining the conductor groove. In some embodiments, the conductor groove extends from a distal end of the top portion of the body to the cavity.

In some embodiments, the cavity includes a first sidewall, a second sidewall, and a bottom wall, wherein the at least one cavity engagement mechanism is on one of the first or second sidewalls. The at least one cavity engagement mechanism may include a plurality of slots in the first sidewall and a plurality of slots in the second sidewall.

In some embodiments, the keeper has a first side surface, a second side surface, an upper surface, and a lower surface, wherein the at least one keeper engagement mechanism is on one of the first or second side surfaces. The lower surface of the keeper may be curved to a least partially circumscribe a conductor positioned in the cavity. The upper surface of the keeper may include a plurality of fastener grooves extending between the first side surface and the second side surface, each of the fastener grooves defined by ridges on the upper surface. The at least one keeper engagement mechanism may be on the first or the second side surface between two of the plurality of fastener grooves.

Further provided is a clamp including a body, a retaining portion of the body, the retaining portion including a cavity with a plurality of holes for receiving fasteners, a conductor groove extending through the body to the cavity, a keeper configured to engage at least partially within the cavity, at least one slot in a sidewall of the cavity or a sidewall of the keeper, and at least one tab extending from the sidewall of the cavity or the sidewall of the keeper. The at least one tab is configured to engage within the at least one slot. The body may include a top portion with two sidewalls at least partially defining the conductor groove. A plurality of the fasteners (e.g., U-bolts) may be provided for extending into the plurality of holes and securing the keeper in the cavity. In some embodiments, the clamp also includes a clevis on a proximal end of the top portion of the body and a sag eye formed integrally with the body.

Further provided is a method of clamping an elongated element, including a step of extending an elongated element through a conductor groove of a clamp and into a cavity of a body of the clamp. The conductor groove extends through the body to the cavity. The clamp includes a retaining portion including the cavity with at least one cavity engagement mechanism and a plurality of holes and a keeper configured to engage at least partially within the cavity, the keeper including at least one keeper engagement mechanism configured to engage with the at least one cavity engagement mechanism. The method further includes steps of positioning the keeper over the elongated element in the cavity with the at least one keeper engagement mechanism engaged with the at least one cavity engagement mechanism and securing the keeper in the cavity with a plurality of fasteners extending into the plurality of holes.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
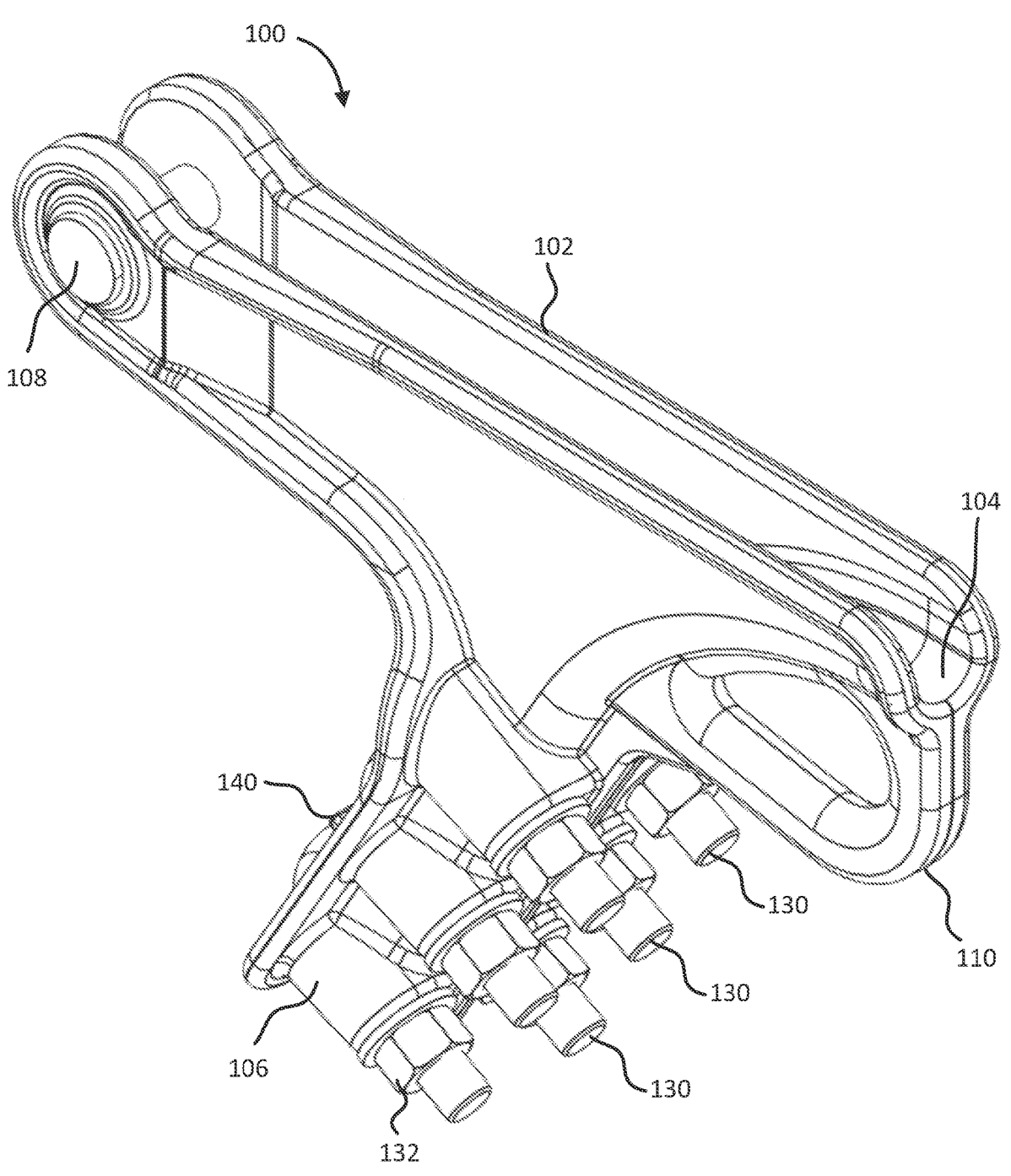
FIG. 1 is an isometric view of a clamp according to an exemplary embodiment of the present disclosure.

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

FIGS. 1-7 show a clamp 100 according to an exemplary embodiment of the present disclosure. The clamp 100 may be referred to as a strain or quadrant dead end clamp. The clamp 100 includes a body 102 that may be made of aluminum, iron, or bronze. Other materials may be used based on the needs of the particular application or use.

As shown in FIGS. 1 and 4-6, the body 102 includes a conductor groove 104 at least partially extending through the body 102. The body 102 may include a top portion with two sidewalls at least partially defining the conductor groove 104. In the exemplary embodiment, the two sidewalls are spaced apart by a distance of approximately 0.8 in. and the conductor groove 104 has a radius at a distal end of the body 102 of approximately 0.4 in. The conductor groove 104 extends through the body 102 to a retaining portion 106 at a bottom of the body 102. The radius of the conductor groove 104 may change (e.g., decrease) along its length. For example, the radius may decrease to approximately 0.2 in. at an opening of the retaining portion 106. These dimensions are exemplary and not intended to limit the scope of the invention. Further, references to "top" or "bottom" are only for illustrated purposes and are not intended to limit the orientation in which the clamp 100 may be used.

As discussed in more detail below, conductor 160 (or cable or any elongated element) may be run through the conductor groove 104 and retained in a cavity 120 of the retaining portion 106 during use. In the exemplary embodiment, the clamp 100 and the conductor groove 104 thereof are configured to receive conductors and/or other elongated elements having a diameter of 0.30-0.75 in. Different sized clamps may accommodate smaller and larger conductors without limitation.

The body 102 of the clamp 100 further includes a clevis 108. In the exemplary embodiment, the clevis 108 comprises a removable pin extending through a hole or holes on a proximal end of the top portion of the body 102. In some embodiments, the clevis 108 is retained in the holes using a cotter pin or key 112 as shown in FIGS. 3-7. The clevis 108 enables attachment of the clamp 100 to a utility pole or tower. One skilled in the art would understand that various attachment mechanisms may be used, such as shackle or ball and socket, to secure the clamp 100 via the clevis 108.

Figure 2:
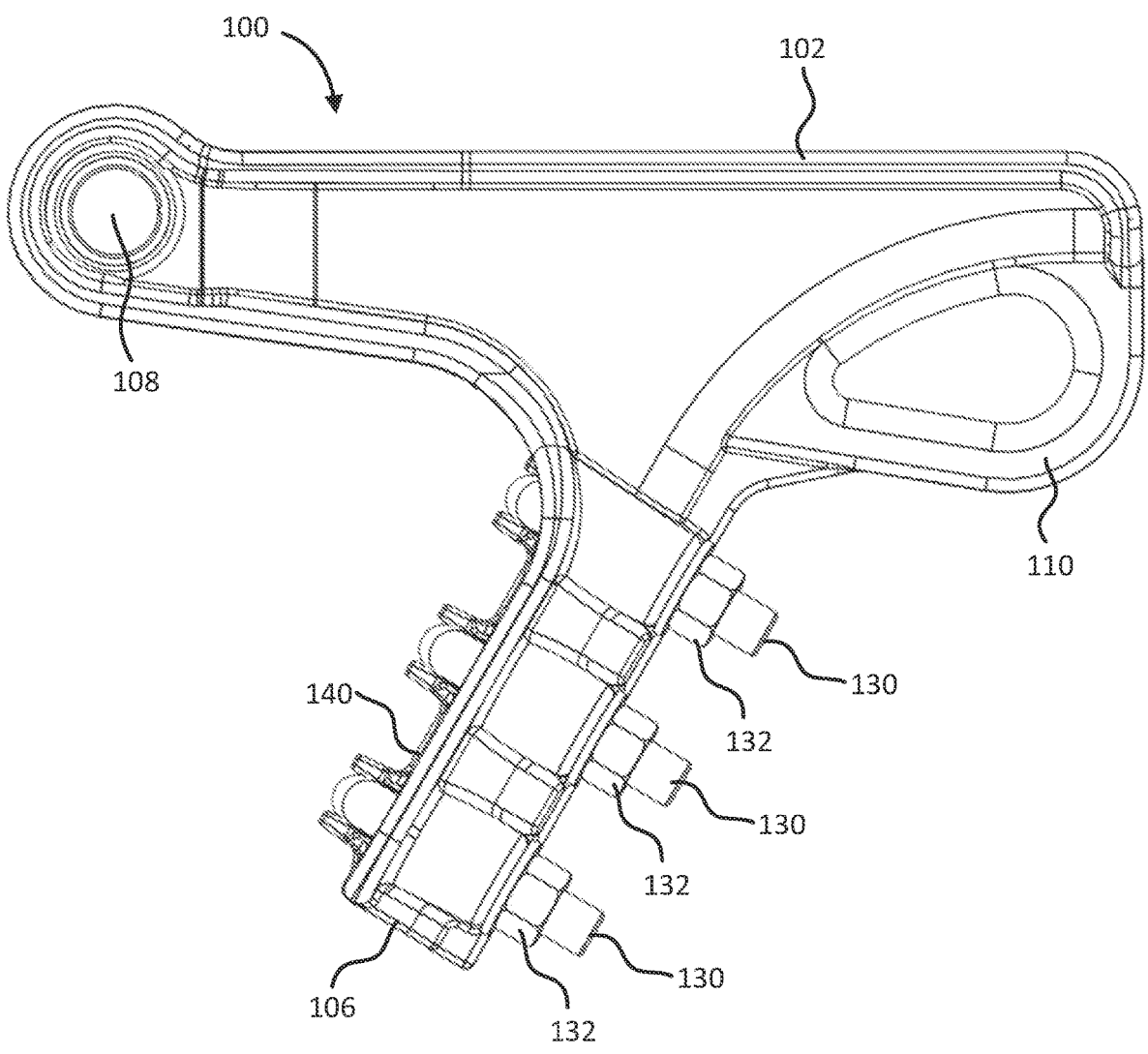
FIG. 2 is a side view of the clamp shown in FIG. 1.
Figure 3:
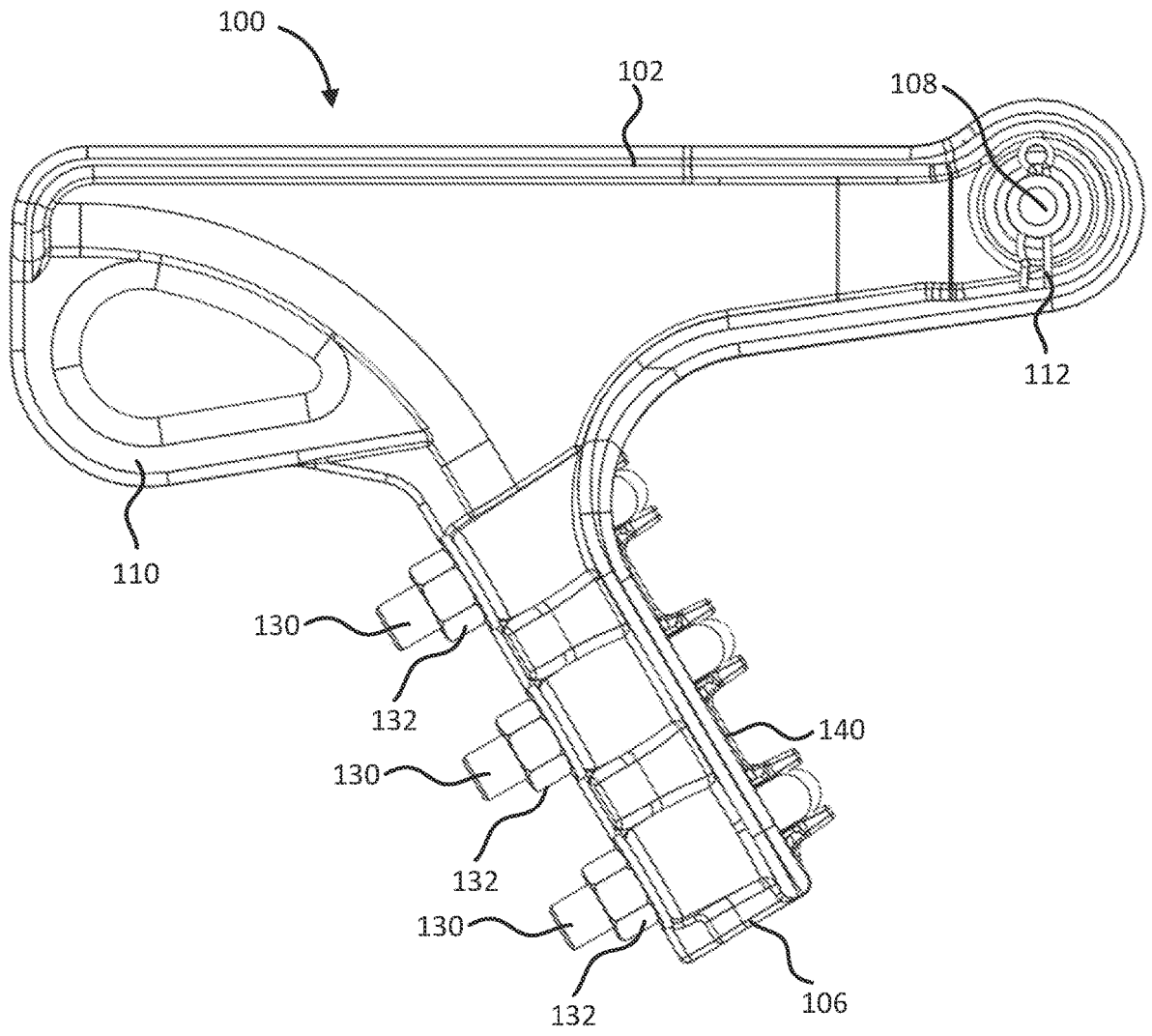
FIG. 3 is another side view of the clamp shown in FIG. 1.

As shown in FIGS. 1-3, the body 102 may also include a sag eye 110 for connecting a ratcheting mechanism or come-along to take tension off the conductor 160 during installation. In the exemplary embodiment, the sag eye 110 is a loop formed integrally with a distal end of the body 102.

Figure 4:
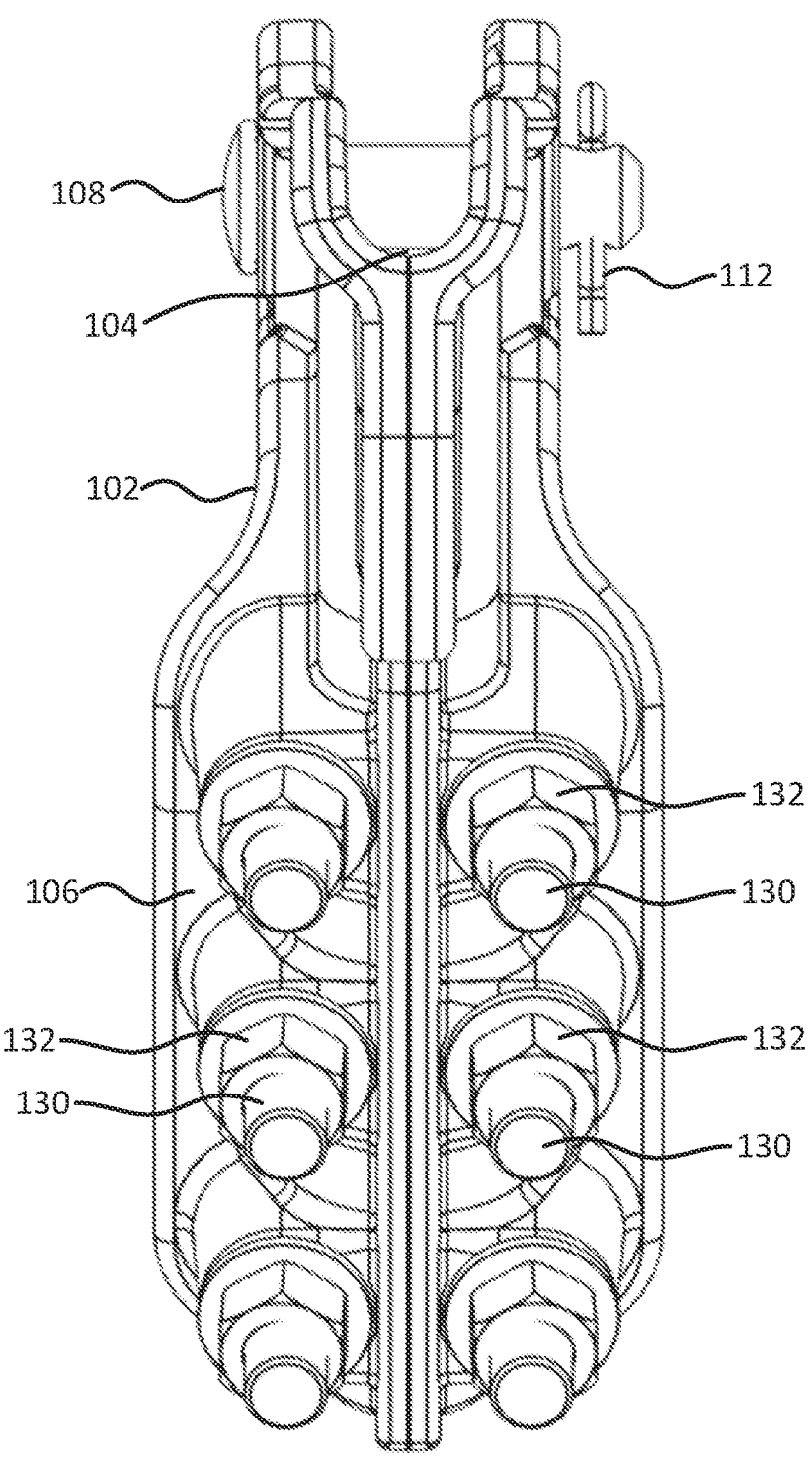
FIG. 4 is a front view of the clamp shown in FIG. 1.
Figure 5:
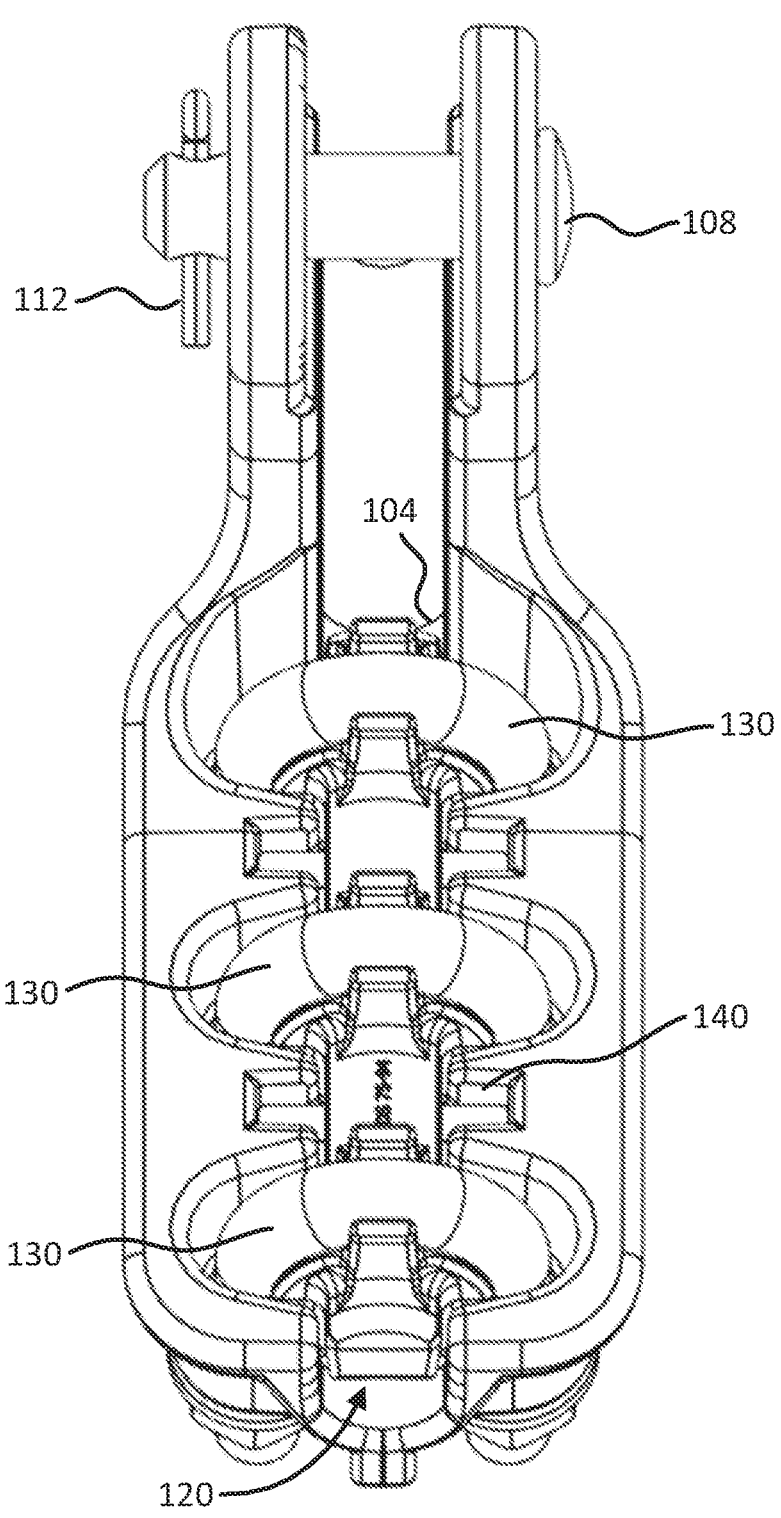
FIG. 5 is a back view of the clamp shown in FIG. 1.
Figure 6:
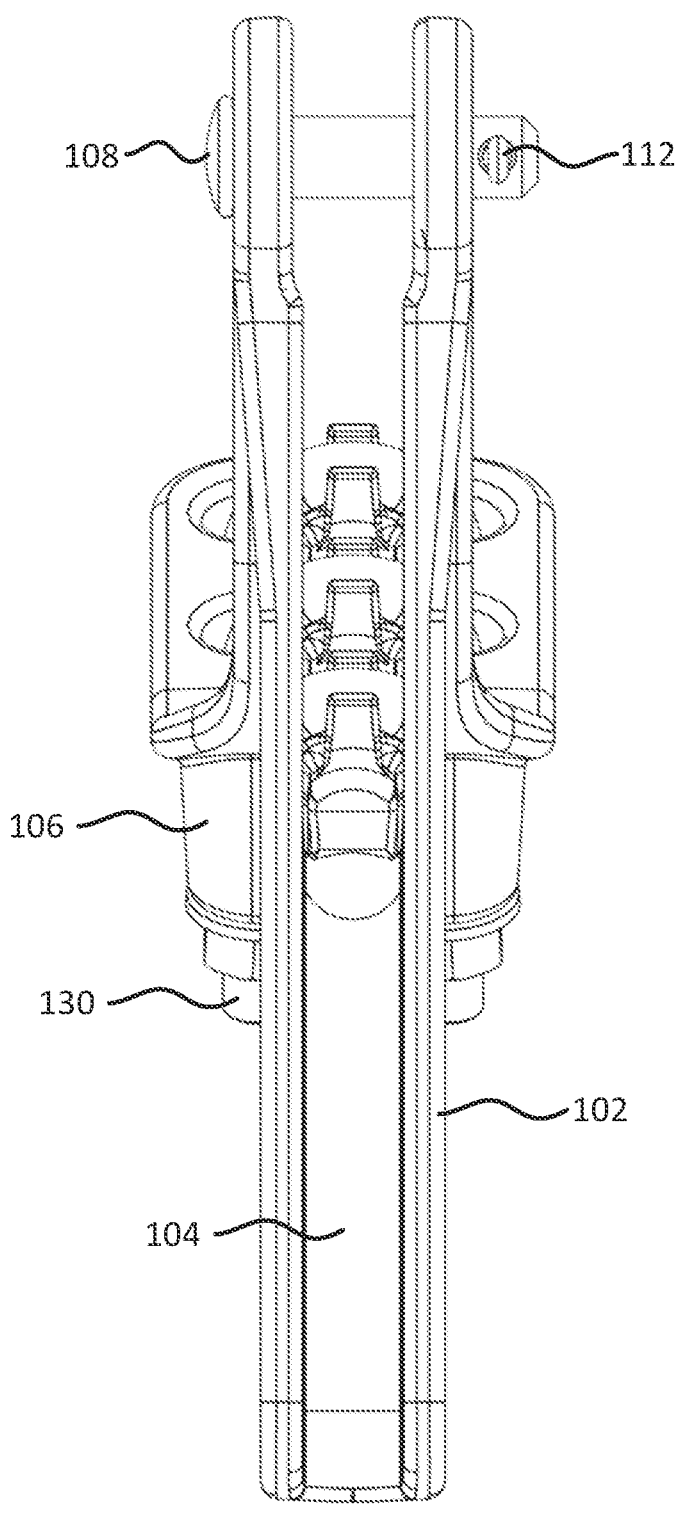
FIG. 6 is a top view of the clamp shown in FIG. 1.
Figure 7:
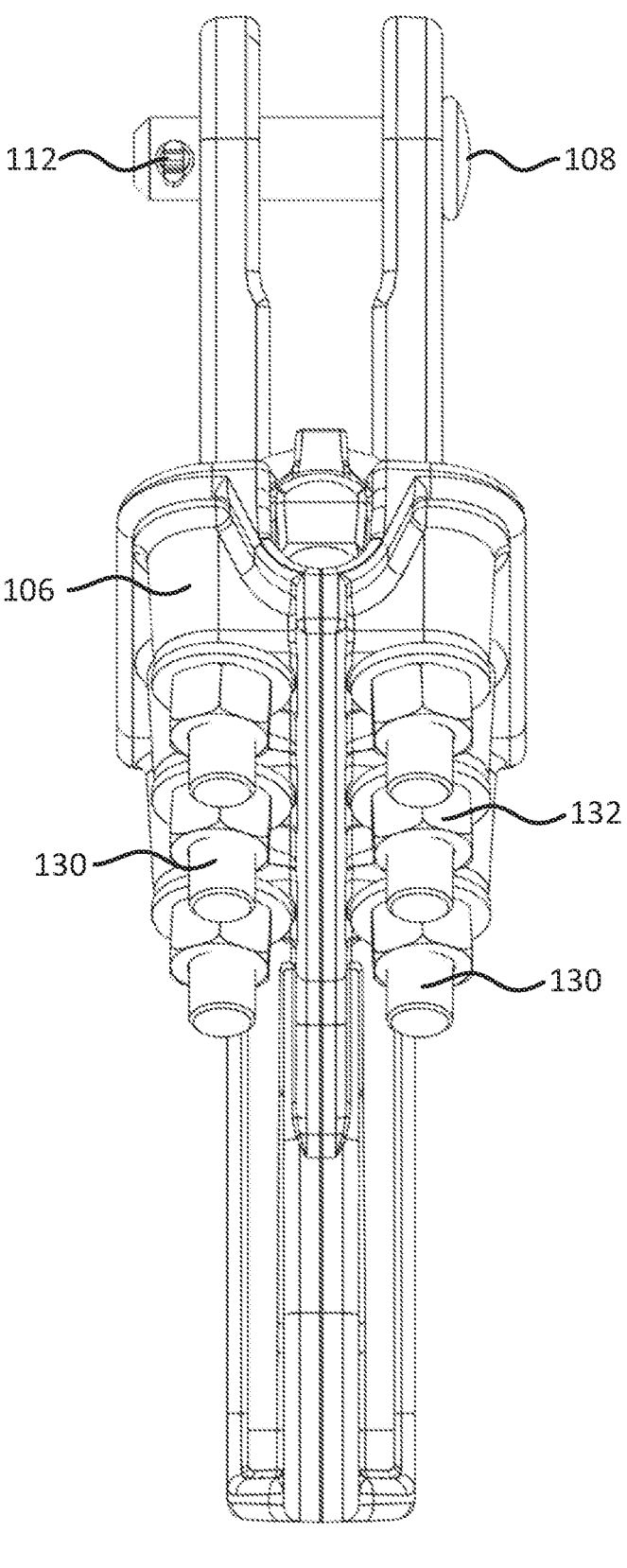
FIG. 7 is a bottom view of the clamp shown in FIG. 1.

FIGS. 4 and 5 are front and back views of the clamp 100, respectively. As shown therein, the body 102 includes a cavity 120 for receiving a keeper 140 and one or more fasteners 130. In the exemplary embodiment, the clamp 100 includes three (3) fasteners 130. In the exemplary embodiment, the fasteners 130 are U-bolts secured with nuts 132, though the invention is not limited thereto. In other embodiments, the clamp 100 may include only two (2) fasteners 130 or four (4) or more fasteners 130, e.g., depending on the size of the conductor 160 and/or the desired tensile strength rating. For example, in one embodiment, the clamp 100 accommodates conductors having a diameter of 0.20-0.64 in. and uses two (2) fasteners 130. In another embodiment, the clamp 100 accommodates conductors having a diameter of 0.46-0.94 in. and uses three (3) fasteners 130. In another embodiment, the clamp 100 accommodates conductors having a diameter of 0.70-1.39 in. and uses four (4) fasteners 130. In another embodiment, the clamp 100 accommodates conductors having a diameter of 1.38-1.85 in. and uses four (4) fasteners 130.

Figure 8:
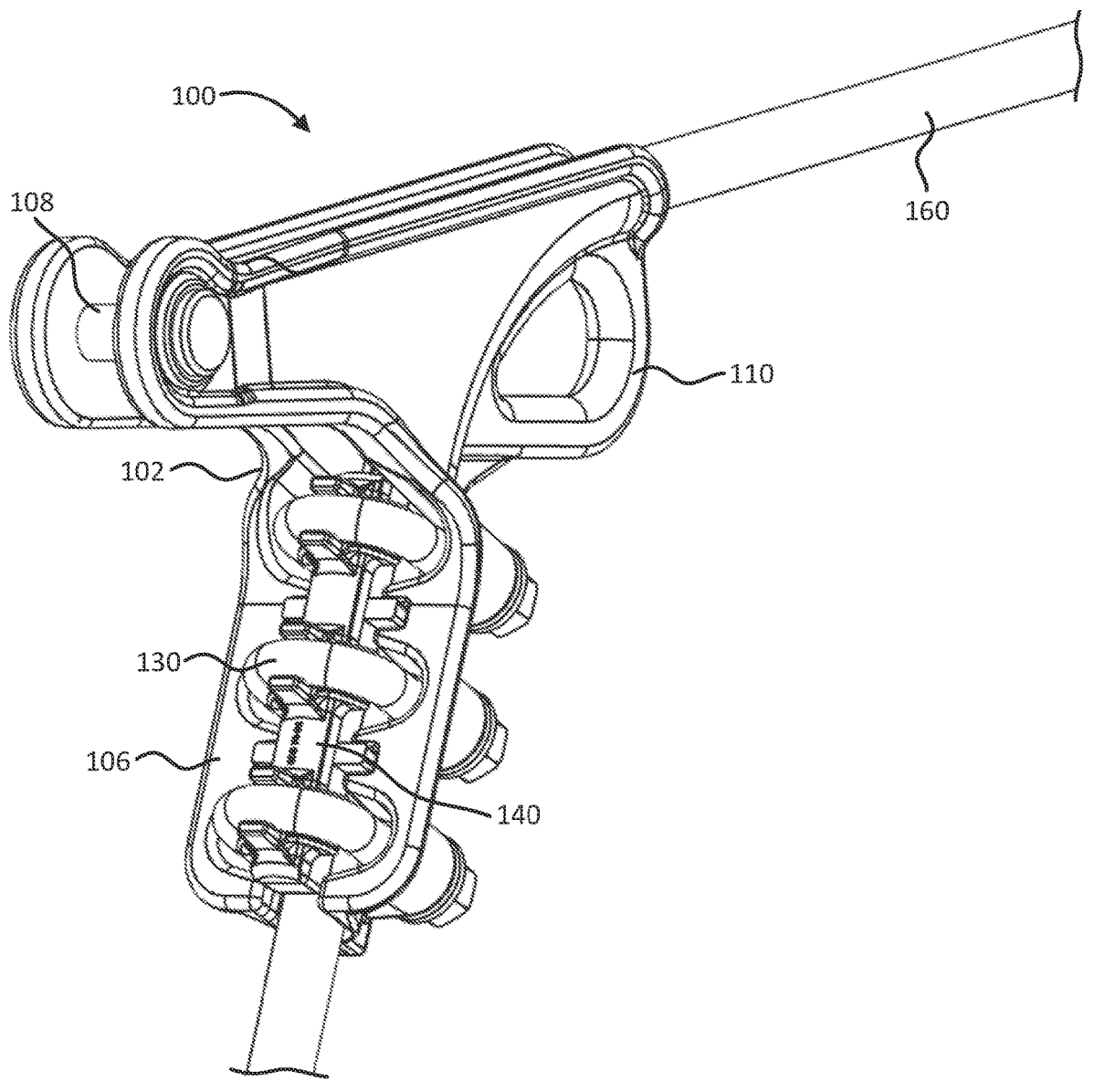
FIG. 8 is an isometric view of a clamp according to an exemplary embodiment of the present disclosure including a conductor.
Figure 9:
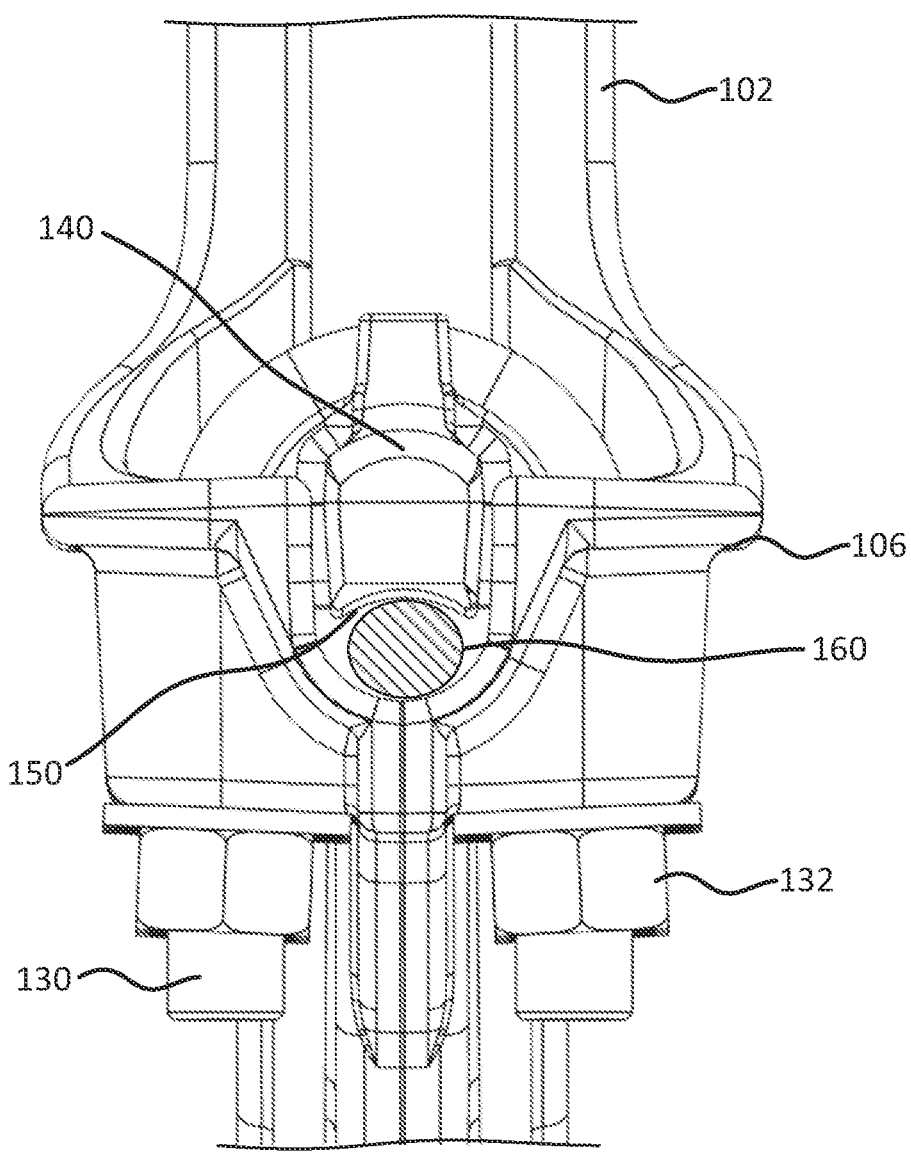
FIG. 9 is an end view of the clamp shown in FIG. 8 including the conductor.

FIGS. 8-9 show the clamp 100 with a conductor 160 secured therein. The conductor 160 is run through the conductor groove 104 and into the cavity 120 of the retaining portion 106. The keeper 140 is positioned over the conductor 160 in the cavity 120 and secured to the body 102 with the fasteners 130. As shown in FIG. 9, the conductor 160 is secured and at least partially compressed in the cavity 120 via a lower surface 150 (or compression surface) of the keeper 140. In the exemplary embodiment, the lower surface 150 is curved and/or concave along its length to at least partially circumscribe the conductor 160.

The lower surface 150 of the keeper 140 may have a radius that is about 30% greater than (or more) than the radius of comparable keepers used in the prior art. For example, the radius of the lower surface 150 may be 0.47 in. or more. This improves the compression ratio and allows for the accommodation of a larger range of conductor sizes. The lower surface has a groove edge fillet 152 on each side that may be reduced by about 50% (e.g., from 0.0625 in. to 0.031 in.) as compared to prior keepers to allow for a higher crush/compression clearance within the tight space between the cavity 120 and the keeper 140. Further, a clearance between the keeper 140 and the bottom wall of the cavity 120 may be about 0.2 in. to allow sufficient grip forces for both minimum and maximum conductor sizes.

Figure 10:
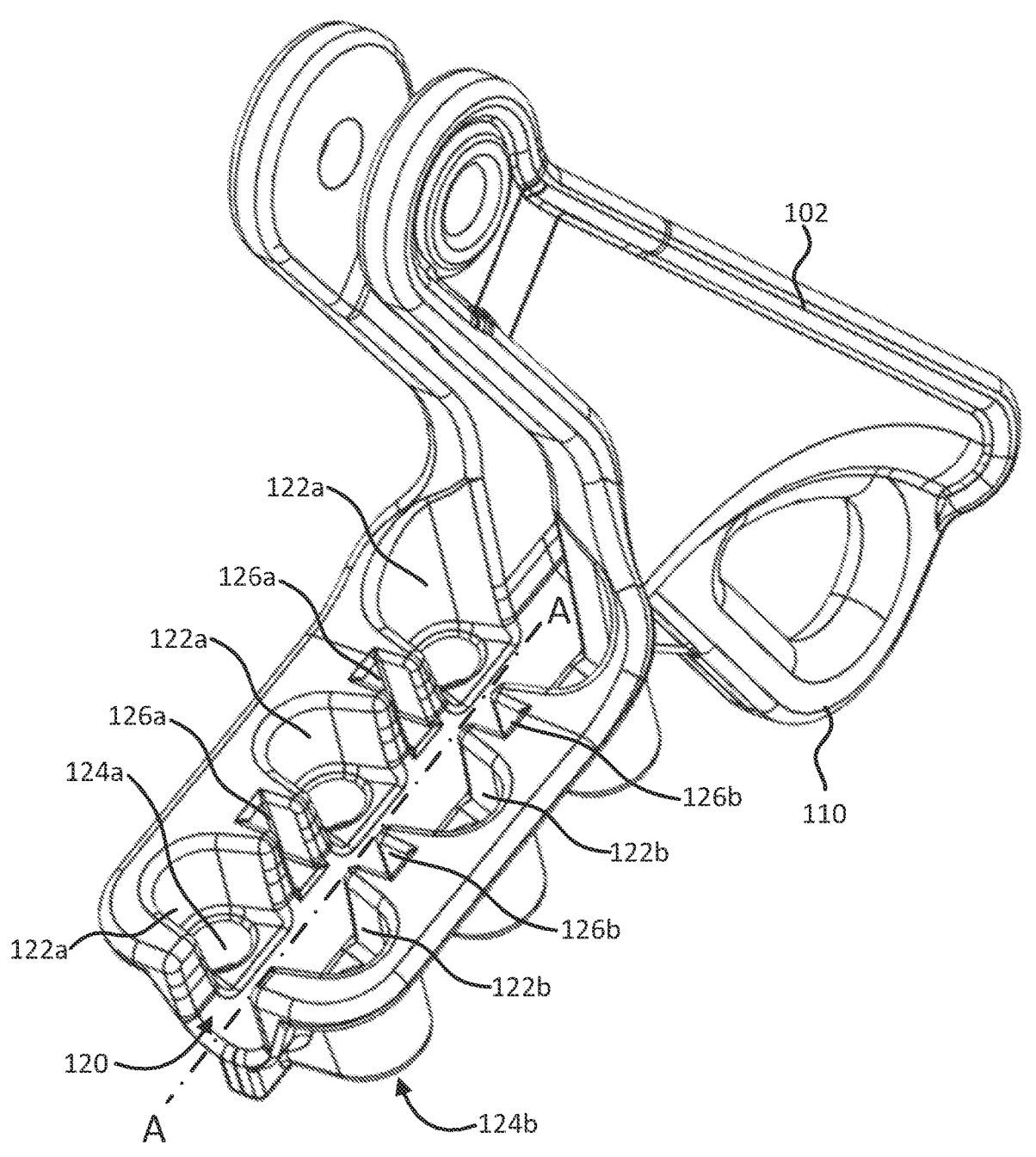
FIG. 10 is an isometric view of a body of a clamp according to an exemplary embodiment of the present disclosure.
Figure 11:
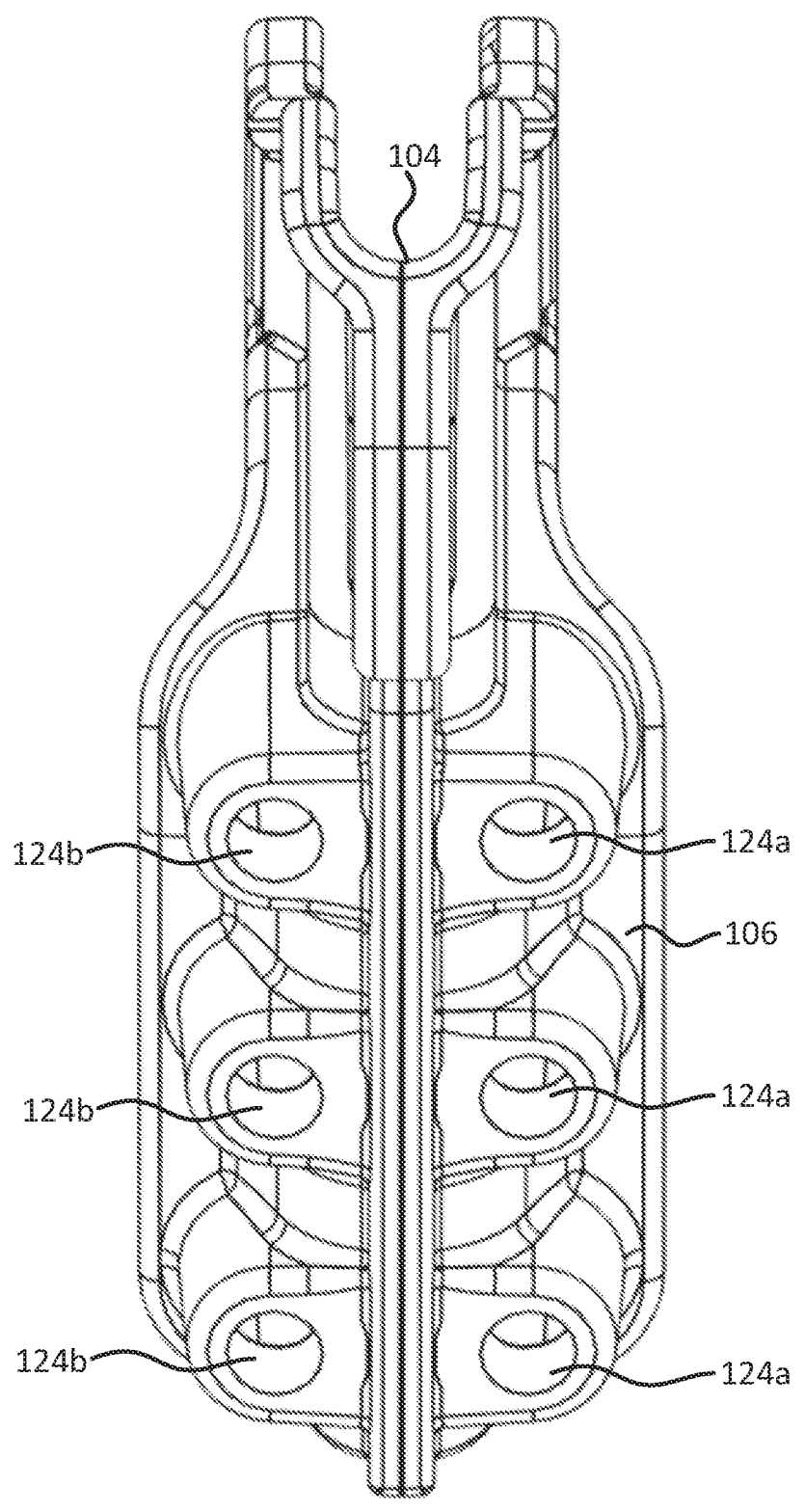
FIG. 11 is a front view of the body of the clamp shown in FIG. 10.
Figure 12:
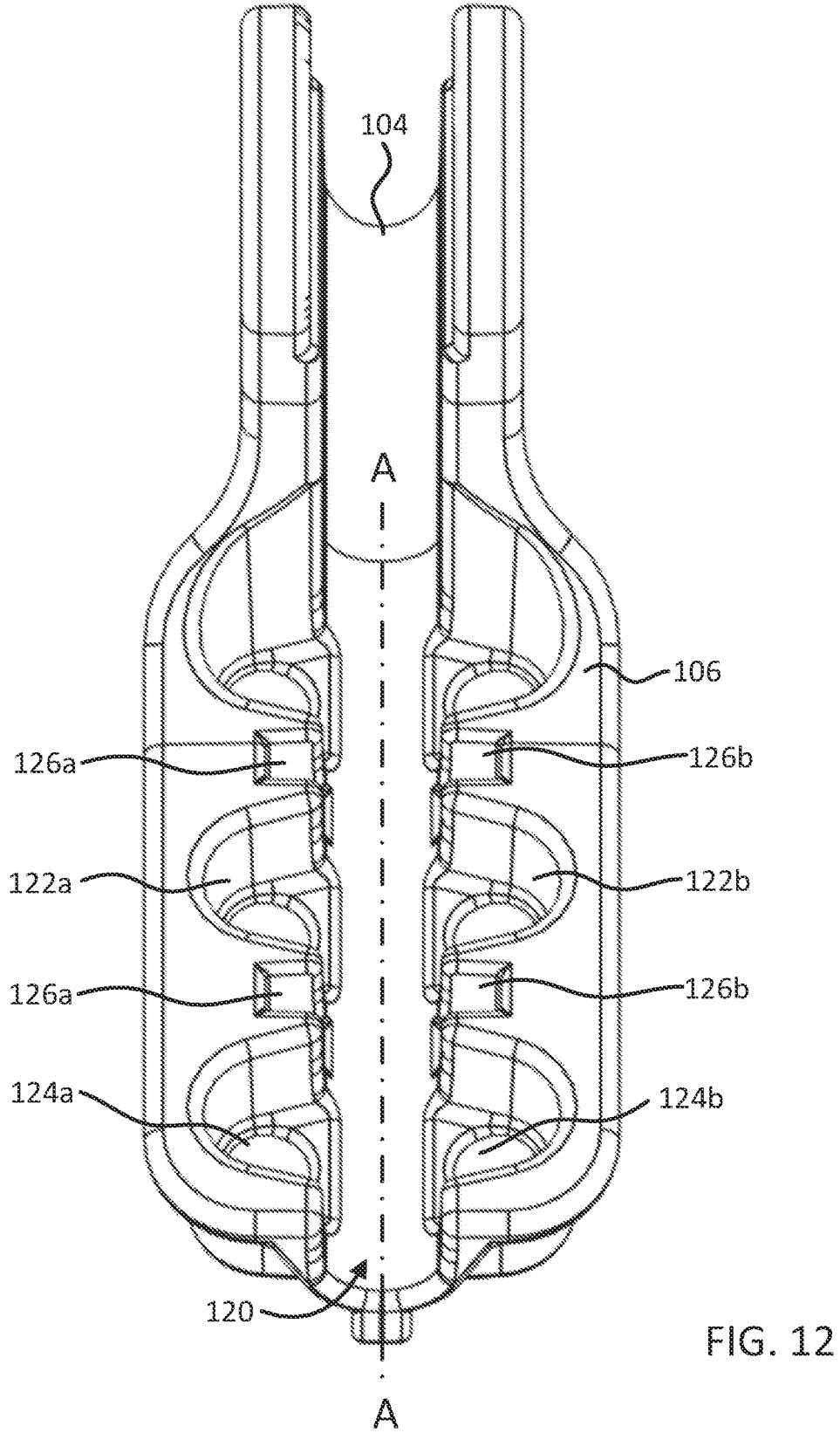
FIG. 12 is a back view of the body of the clamp shown in FIG. 10.

FIGS. 10-12 show the body 102 of the clamp 100 without the keeper 140 or fasteners 130. In the exemplary embodiment, the cavity 120 of the clamp 100 includes a plurality of opposing openings 122a and 122b on left and right sides of the cavity 120 with corresponding holes 124a and 124b for receiving fasteners 130. In the exemplary embodiment, each pair of holes 124a and 124b are spaced apart by approximately 1.5 in. The cavity 120 also includes at least one cavity engagement mechanism, such as at least one slot 126a in a sidewall of the cavity 120 or pairs of opposing slots 126a and 126b. As shown in FIG. 10, the slots 126a and 126b may be positioned between each of the pairs of openings 122a and 122b. In the exemplary embodiment, the slots 126a and 126b extend substantially perpendicular to a longitudinal axis A of the cavity 120 and/or substantially perpendicular to a corresponding longitudinal axis of the conductor 160.

FIGS. 13-16 show the keeper 140 of the clamp 100 according to an exemplary embodiment of the present disclosure. The keeper 140 has a lower surface 150 and an upper surface. In the exemplary embodiment, the upper surface is comprised of a plurality of grooves 144 against which the fasteners 130 engage the keeper 140. The grooves 144 may be defined between corresponding ridges 146. In the exemplary embodiment, the distance between the centers of adjacent grooves 144 is approximately 1.5 in. to 2 in. (e.g., 1.75 in.).

Figure 13:
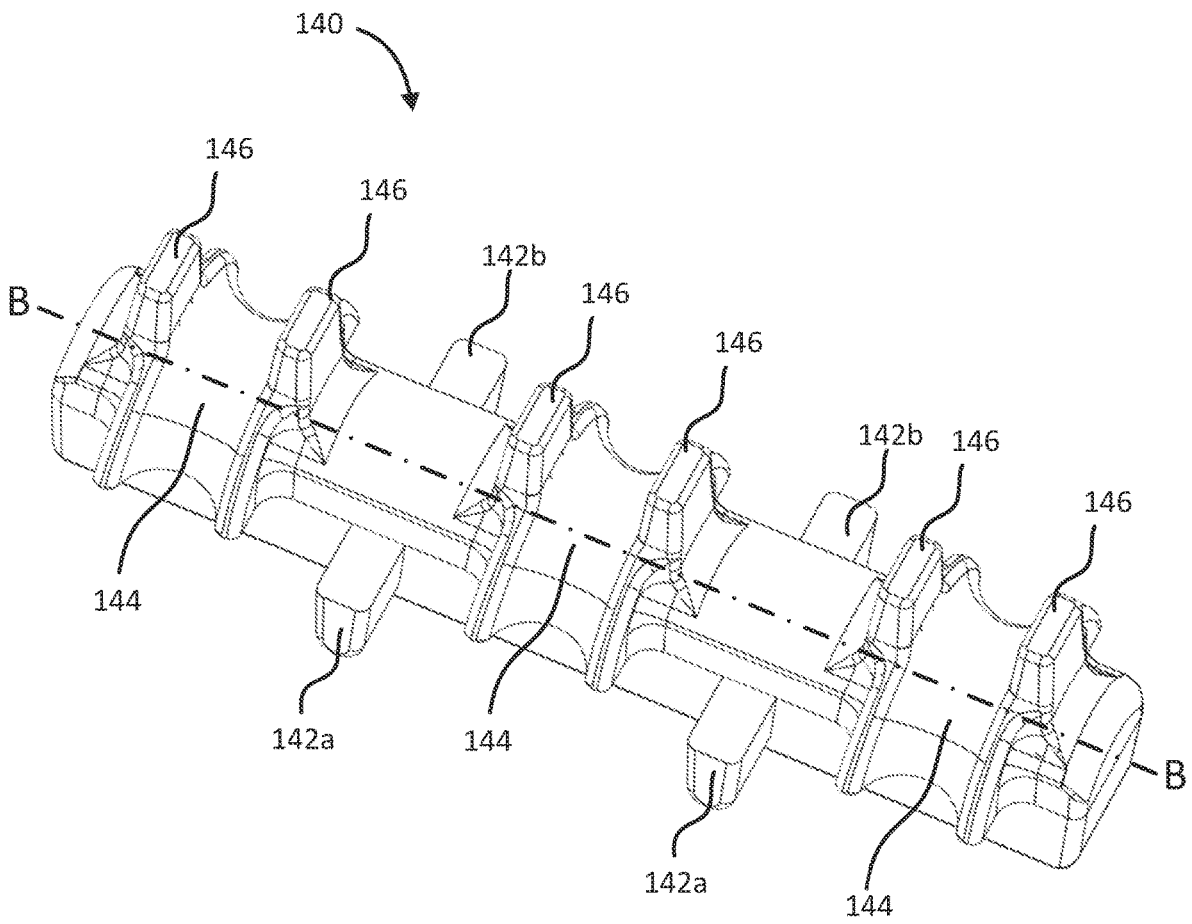
FIG. 13 is an isometric view of a keeper of a clamp according to an exemplary embodiment of the present disclosure.
Figure 14:
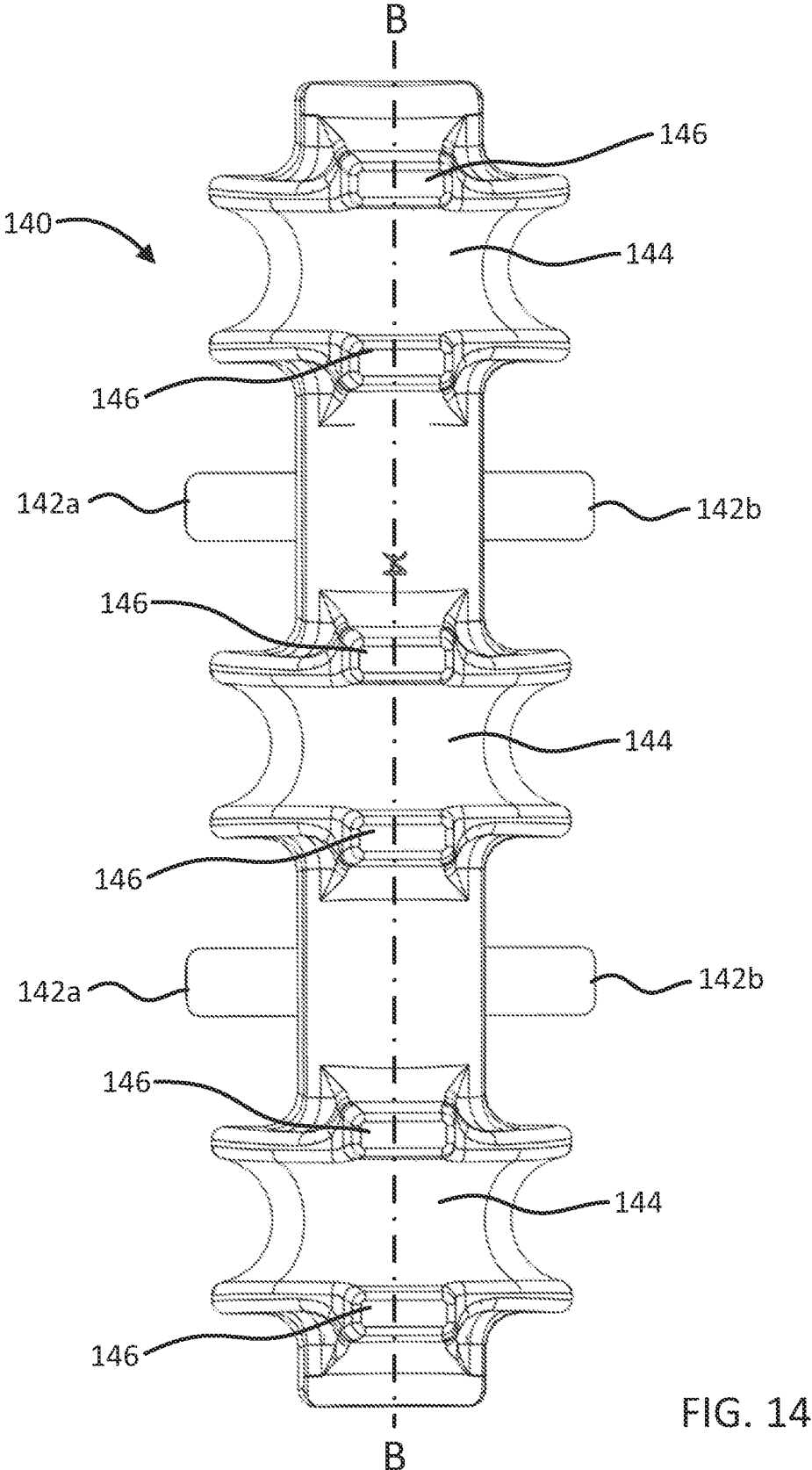
FIG. 14 is a top view of the keeper of the clamp shown in FIG. 13.

The keeper 140 further includes one or more keeper engagement mechanisms for engaging the corresponding cavity engagement mechanisms. The respective engagement mechanisms align the keeper 140 and prevent slippage. For example, as shown in FIG. 13, the keeper engagement mechanisms may be a plurality of tabs 142a and 142b or protrusions that extend outward from opposite sides or sidewalls of the keeper 140. In the exemplary embodiment, the tabs 142a and 142b extend substantially perpendicular to a longitudinal axis B of the keeper 140.

Figure 15:
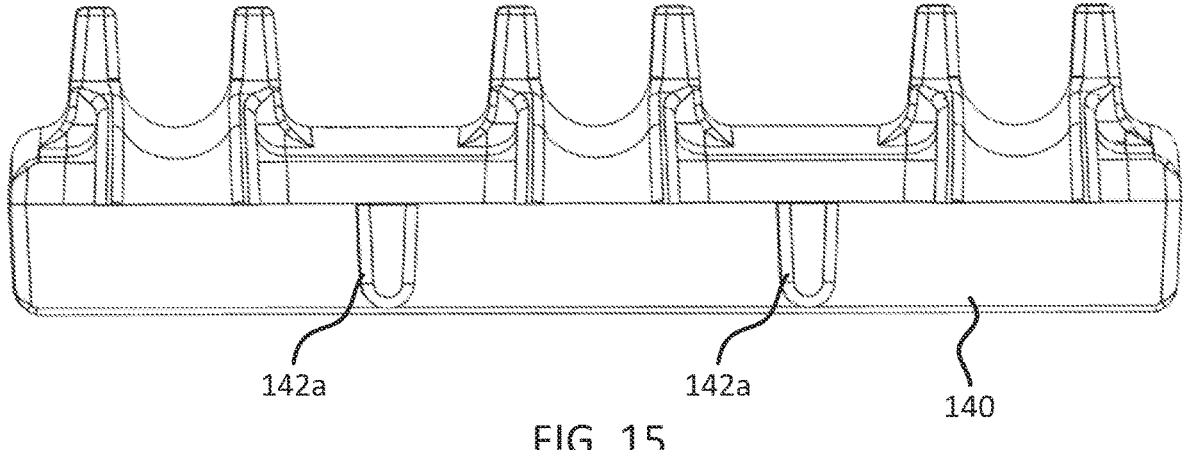
FIG. 15 is a side view of the keeper of the clamp shown in FIG. 13.
Figure 16:
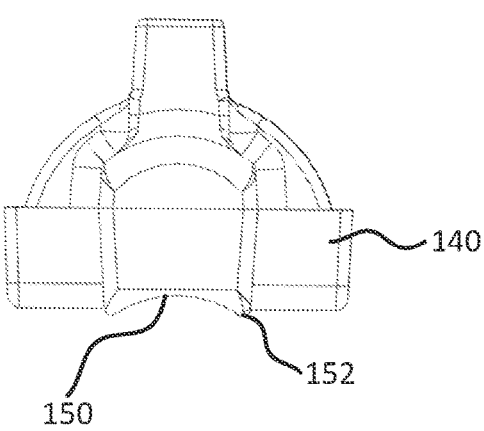
FIG. 16 is an end view of the keeper of the clamp shown in FIG. 13.

As shown in FIG. 15, the tabs 142a and 142b may have a rounded bottom and/or may decrease in width from a top end to a bottom end to ease engagement into the corresponding slots 126a and 126b in the cavity 120. As shown in FIG. 16, the lower surface 150 of the keeper 140 is concave to at least partially circumscribe the conductor 160.

The shape, size, and configurations of the cavity engagement mechanisms and keeper engagement mechanisms described and shown herein are not intended to be limiting. For example, in another exemplary embodiment, the configurations are reversed such that tabs or protrusions are in the cavity of the clamp and the keeper includes slots to engage with such tabs or protrusions.

Figure 17:
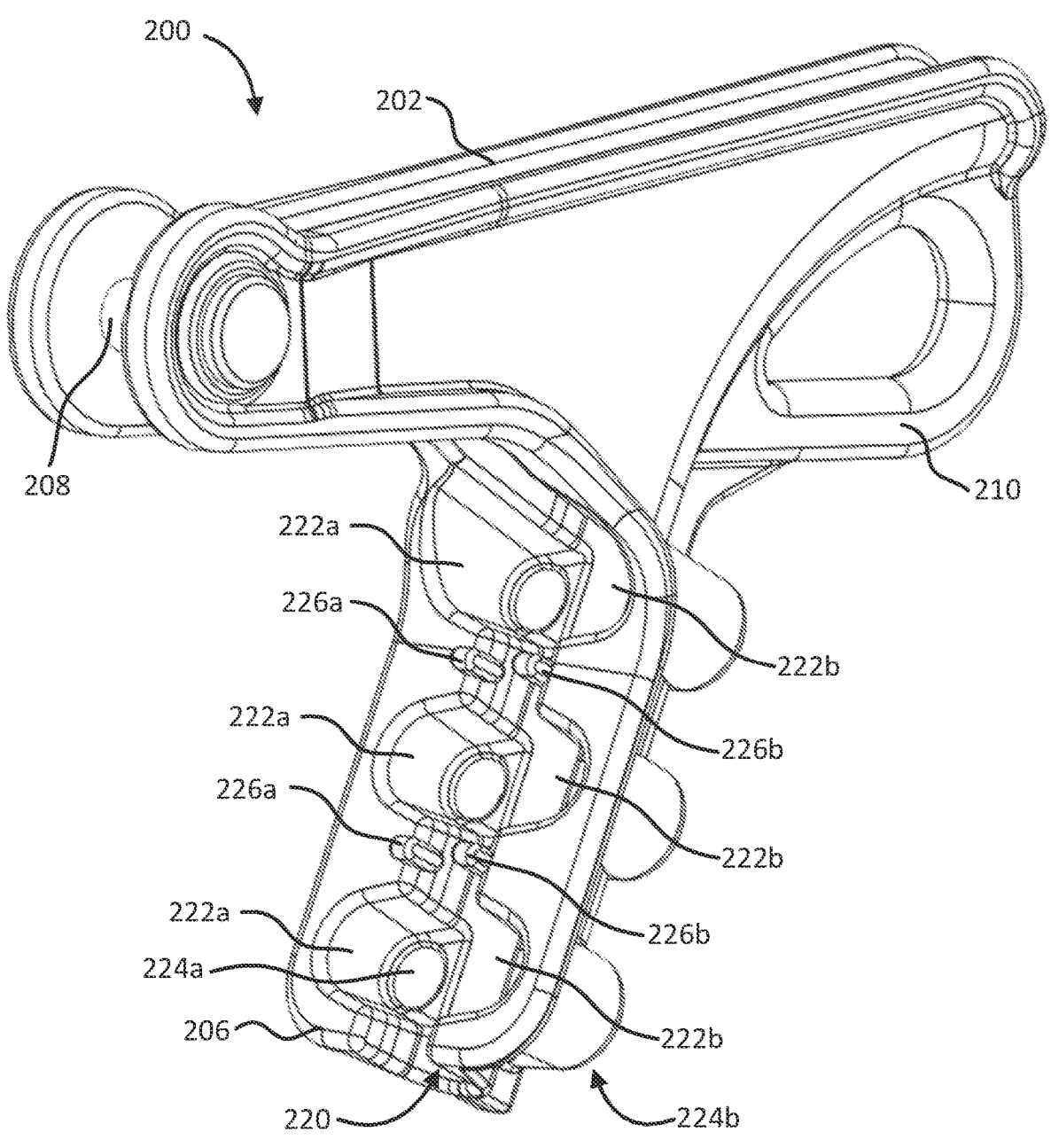
FIG. 17 is an isometric view of a body of a clamp according to an exemplary embodiment of the present disclosure.
Figure 18:
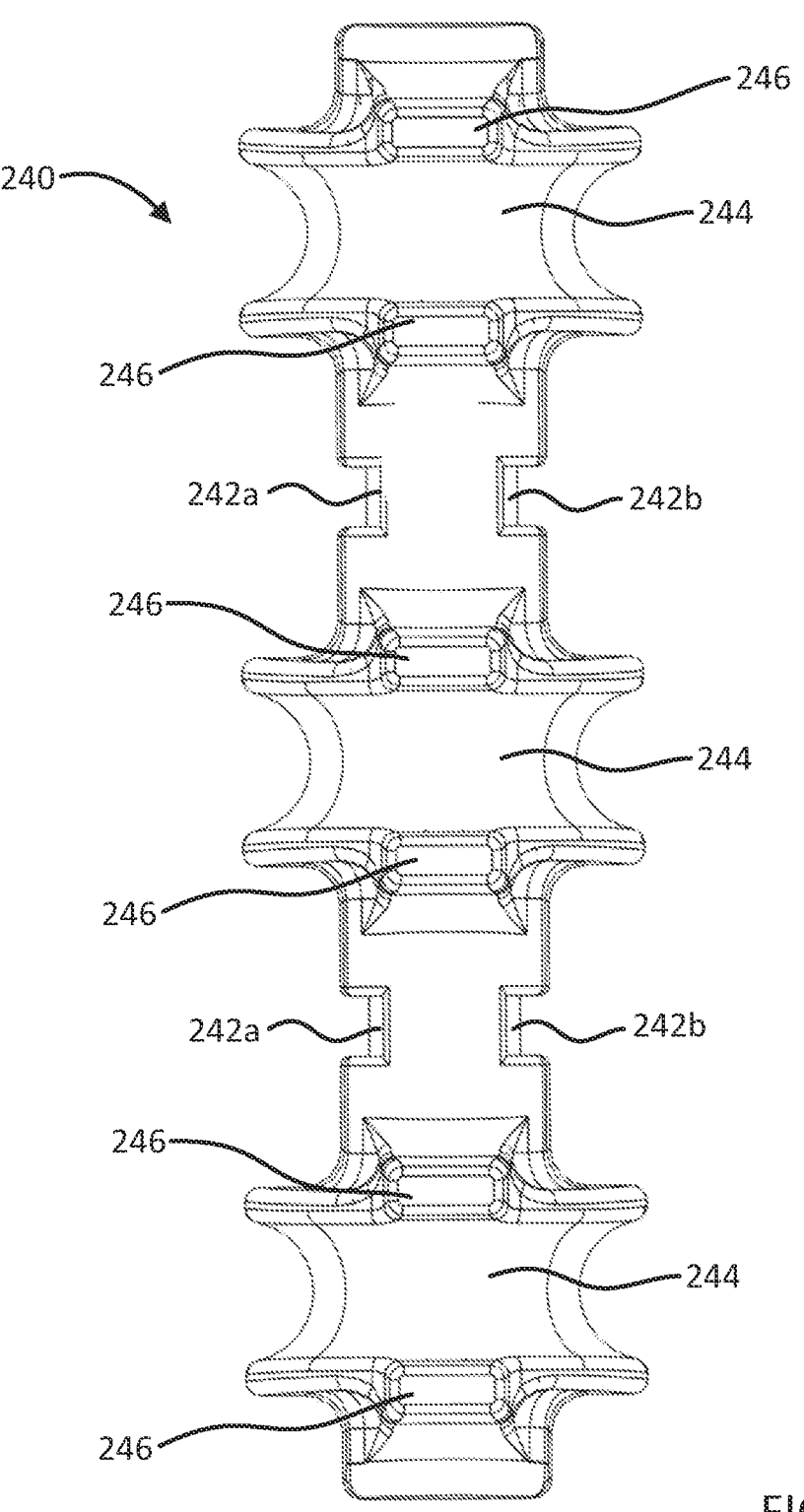
FIG. 18 is an isometric view of a keeper of a clamp according to an exemplary embodiment of the present disclosure.

FIGS. 17-18 illustrate another embodiment of a clamp 200 having a body 202 and a keeper 240. Except as described below, the clamp 200 may share the same features as the clamp 100 described above. For example, the clamp 200 may include a clevis 208, a sag eye 210, and a retaining portion 206 with a cavity 220 for receiving a keeper 240.

As shown in FIG. 17, the cavity 220 includes a plurality of opposing openings 222a and 222b on left and right sides of the cavity 220 with corresponding holes 224a and 224b for receiving fasteners (e.g., U-bolts). The cavity 220 also includes at least one cavity engagement mechanism, such as at least one protrusion 226a on a sidewall of the cavity 220 or pairs of opposing protrusions 226a and 226b positioned between each of the pairs of openings 222a and 222b. In the exemplary embodiment, the protrusions 226a and 226b extend above an upper edge of the cavity 220 to ease alignment with and installation of the keeper 240.

As shown in FIG. 18, the keeper 240 has an upper surface comprised of a plurality of grooves 244 against which the fasteners engage the keeper 240. The grooves 244 may be defined between corresponding ridges 246. The keeper 240 further includes one or more keeper engagement mechanisms for engaging the corresponding cavity engagement mechanisms. In the exemplary embodiment, the keeper engagement mechanisms may be a plurality of slots 242a and 242b in the sidewalls of the keeper 240 extending between the upper surface of the keeper 240 and a lower surface of the keeper 240. Similar to the keeper 140, the lower surface of the keeper 240 is curved and/or concave along its length to at least partially circumscribe a conductor.

The clamp according to the exemplary embodiments described herein provides numerous advantages over prior art clamps. For example, embodiments of the clamp may prevent slippage and provide an improved normal tension of 60% rated breaking strength of an installed conductor.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A dead end clamp, comprising:
   a body;
   a clevis on a proximal end of the body;
   a sag eye formed integrally with a distal end the body;
   a retaining portion of the body, the retaining portion including a cavity with a bottom wall, a first sidewall, a second sidewall, at least one cavity engagement mechanism comprising a first slot in the first sidewall of the cavity, and a plurality of holes in the bottom wall of the cavity;
   a conductor groove extending through the body to the cavity;
   a keeper removably positioned within the cavity, the keeper including an upper surface, a lower surface, two side surfaces between the upper surface and the lower surface including a first side surface and second side surface opposite the first side surface, at least one keeper engagement mechanism comprising a first tab extending outward from the first side surface of the keeper, in a direction perpendicular to a longitudinal axis of the keeper, configured to engage with the first slot to align and prevent slippage of the keeper, the first tab having a length from the first side surface to a distal end of the first tab and a width in a direction along the longitudinal axis of the keeper, wherein the length is greater than the width; and a plurality of fasteners for extending over the upper surface of the keeper and into at least one of the plurality of holes to secure the keeper in the cavity, wherein each of the first and second sidewalls of the cavity includes a plurality of depressions spaced apart along a longitudinal axis of the cavity, each of the depressions at least partially circumscribing one of the plurality of holes, and wherein the first slot is positioned longitudinally between two adjacent ones of the plurality of depressions on the first sidewall of the cavity.

2. The dead end clamp of claim 1, wherein the at least one cavity engagement mechanism includes a second slot on the second sidewall opposite the first slot, and wherein the at least one keeper engagement mechanism includes a second tab extending outward from the second side surface of the keeper, in a direction perpendicular to the longitudinal axis of the keeper, to engage in the second slot.

3. The dead end clamp of claim 2, wherein each of the first and second slots extend substantially perpendicular to the longitudinal axis of the cavity.

4. The dead end clamp of claim 1, wherein the body includes a top portion with two sidewalls at least partially defining the conductor groove.

5. The dead end clamp of claim 4, wherein the conductor groove extends from a distal end of the top portion of the body to the cavity.

6. The dead end clamp of claim 1, wherein the at least one cavity engagement mechanism includes a plurality of slots in the first sidewall and a plurality of slots in the second sidewall.

7. The dead end clamp of claim 1, wherein the lower surface of the keeper is curved to a least partially circumscribe a conductor positioned in the cavity.

8. The dead end clamp of claim 7, wherein the upper surface of the keeper includes a plurality of fastener grooves configured to engage with the fasteners and extending between the first side surface and the second side surface of the keeper, each of the fastener grooves defined by ridges on the upper surface.

9. The dead end clamp of claim 8, wherein the at least one keeper engagement mechanism is on the first or the second side surface between two of the plurality of fastener grooves.

10. The dead end clamp of claim 1, wherein an opening of the first slot is positioned laterally inboard of the plurality of holes in the cavity.

11. The dead end clamp of claim 1, wherein the first tab has a top adjacent to the upper surface of the keeper a bottom adjacent to the lower surface of the keeper, wherein the width of the first tab tapers from the top to the bottom.

12. A dead end clamp, comprising:

a body;

a clevis on a proximal end of the body;

a sag eye formed integrally with a distal end of the body;

a retaining portion of the body, the retaining portion including a cavity with a bottom wall, a first sidewall, a second sidewall, and a plurality of holes in the bottom wall of the cavity for receiving fasteners, wherein each of the first and second sidewalls includes a plurality of depressions spaced apart along a longitudinal axis of the cavity, each of the depressions at least partially circumscribing one of the plurality of holes;

a conductor groove extending through the body to the cavity;

a keeper configured to engage at least partially within the cavity including an upper surface, a lower surface, two side surfaces between the upper surface and the lower surface including a first side surface and second side surface opposite the first side surface;

at least one slot in the first sidewall of the cavity positioned longitudinally between two adjacent ones of the plurality of depressions on the first sidewall of the cavity; and at least one tab extending from the first side surface or the second side surface of the keeper, in a direction perpendicular to a longitudinal axis of the keeper, the at least one tab having a length from the first side surface or the second side surface to a distal end of the at least one tab and a width in a direction along the longitudinal axis of the keeper, wherein the length is greater than the width;

wherein the at least one tab is configured to engage within the at least one slot to align and prevent slippage of the keeper.

13. The dead end clamp of claim 12, further comprising a plurality of the fasteners extending into the plurality of holes and securing the keeper in the cavity, wherein the plurality of fasteners are U-bolts.

14. The dead end clamp of claim 12, wherein the body includes a top portion with two sidewalls at least partially defining the conductor groove.

15. The dead end clamp of claim 12, wherein an opening of the at least one slot is positioned laterally inboard of the plurality of holes in the cavity.

16. A method of clamping an elongated element, comprising steps of:

extending the elongated element through a conductor groove of a dead end clamp and into a cavity of a body of the dead end clamp, the dead end clamp comprising a clevis on a proximal end of the body, a sag eye on a distal end of the body, a retaining portion including the cavity with a bottom wall, a first sidewall, a second sidewall, at least one cavity engagement mechanism comprising a first slot in the first sidewall of the cavity, and a plurality of holes in the bottom wall of the cavity, the conductor groove extending through the body to the cavity, and a keeper configured to engage at least partially within the cavity, the keeper including an upper surface, a lower surface, two side surfaces between the upper surface and the lower surface including a first side surface and second side surface opposite the first side surface, at least one keeper engagement mechanism comprising a first tab extending outward from the first side surface of the keeper, in a direction perpendicular to a longitudinal axis of the keeper, configured to engage with the first slot to align and prevent slippage of the keeper, the first tab having a length from the first side surface to a distal end of the first tab and a width in a direction along the longitudinal axis of the keeper, wherein the length is greater than the width, wherein each of the first and second sidewalls of the cavity includes a plurality of depressions spaced apart along a longitudinal axis of the cavity, each of the depressions at least partially circumscribing one of the plurality of holes, and wherein the first slot is positioned longitudinally between two adjacent ones of the plurality of depressions on the first sidewall of the cavity;

positioning the keeper over the elongated element in the cavity with the at least one keeper engagement mechanism engaged with the at least one cavity engagement mechanism; and securing the keeper in the cavity with a plurality of fasteners extending into the plurality of holes.

17. The method of claim 16, wherein the at least one cavity engagement mechanism of the retaining portion includes a second slot on the second sidewall opposite the first slot, and wherein the at least one keeper engagement mechanism of the keeper includes a second tab extending from the second side surface of the keeper, in a direction perpendicular to the longitudinal axis of the keeper, to engage in the second slot.

18. The method of claim 17, wherein each of the first and second slots extend substantially perpendicular to the longitudinal axis of the cavity.

19. The method of claim 16, wherein the at least one cavity engagement mechanism of the retaining portion includes a plurality of slots in the first sidewall and a plurality of slots in the second sidewall.

20. The method of claim 16, wherein the lower surface of the keeper is curved to a least partially circumscribe a conductor in the cavity.

21. The method of claim 20, wherein the upper surface of the keeper includes a plurality of fastener grooves extending between the first side surface and the second side surface of the keeper, each of the fastener grooves defined by ridges on the upper surface.

22. The method of claim 16, wherein the dead end clamp provides a normal tension of at least 60% of a rated breaking strength of the elongated element.

\* \* \* \* \*